Nov. 19, 1957 G. F. SKALA 2,813,962
SURFACE COOKING UNIT CONTROL APPARATUS
Filed April 20, 1956 2 Sheets-Sheet 1

INVENTOR.
GEORGE F. SKALA
BY
HIS ATTORNEY

Nov. 19, 1957  G. F. SKALA  2,813,962
SURFACE COOKING UNIT CONTROL APPARATUS
Filed April 20, 1956  2 Sheets-Sheet 2
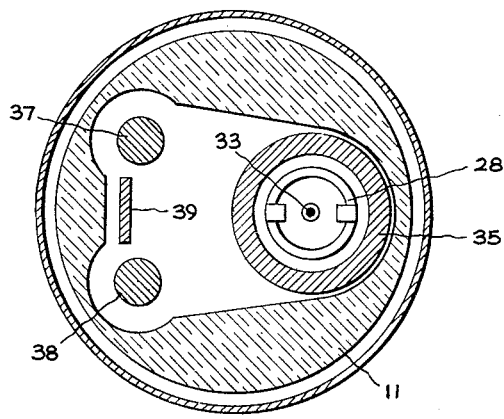
FIG. 4
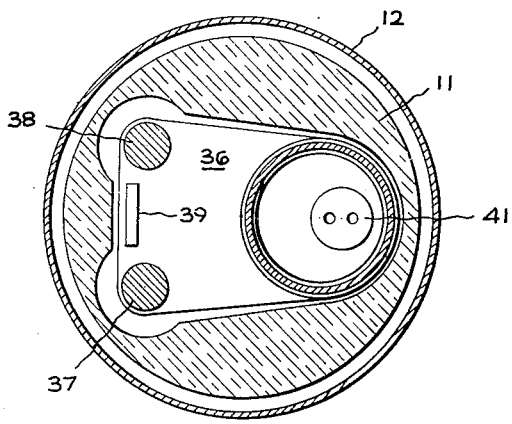
FIG. 5
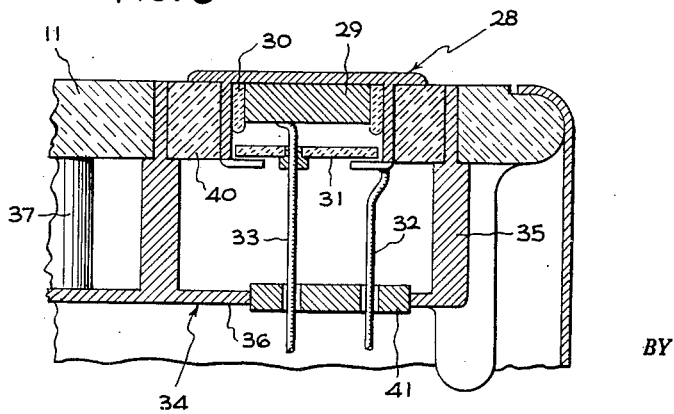
FIG. 6
INVENTOR.
GEORGE F. SKALA
BY 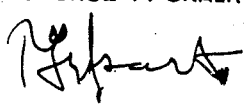
HIS ATTORNEY

United States Patent Office 2,813,962
Patented Nov. 19, 1957

2,813,962

SURFACE COOKING UNIT CONTROL APPARATUS

George F. Skala, Schenectady, N. Y., assignor to General Electric Company, a corporation of New York Application April 20, 1956, Serial No. 579,687

5 Claims. (Cl. 219—37)

This invention relates to thermostatically controlled surface cooking units, and more particularly to temperature sensing control devices for such cooking units.

The measurement of the temperature of a utensil resting on a surface cooking unit by means of a sensing element in contact with the bottom of the utensil presents a number of problems chiefly resulting from the variable and frequently high temperatures encountered. These factors are further complicated by the wide variety of utensils found in the average kitchen and, in particular, the condition and evenness of the bottoms of such utensils.

Tests have indicated that under maximum heat output conditions, as when a large utensil containing water is heated, the temperature of the reflector under the surface units rises to 375° F. and the supporting structure of heating unit may be as high as 875° F. On the other hand a very light frying load (for example, a shallow fry pan containing a few strips of bacon) which requires a heat output of the order of only a few hundred watts, but a pan temperature of 450° F., may result in a reflector temperature of 130° F. and a support temperature of only 275° F. Furthermore, transient temperature conditions, such as the conditions which exist when a cold pan is being heated to cooking temperature, add additional factors which must be considered in the design of a temperature detector suitable for use in thermostatically controlled heating units. Under some conditions the temperature of a utensil may rise at a rate of 200° F. per minute, so that a temperature sensing device with only a 15 second time constant may lag utensil temperature by as much as 50° F.

A principal object of this invention is to provide thermostatically controlled surface cooking apparatus adapted to detect utensil temperature with improved accuracy under both steady state and transient temperature conditions so as to make possible more precise temperature control.

Another object of this invention is to provide a temperature sensing device for thermostatically controlled surface cooking units adapted to respond accurately to utensil temperature through a wide range of ambient temperature conditions.

Another object of this invention is to provide a temperature sensing device for thermostatically controlled surface cooking units adapted to make good surface-to-surface contact with flat bottom utensils and satisfactory multi-point contact with utensils having uneven bottoms.

Further objects and advantages of this invention will become apparent as the following description proceeds, and the features of novelty which characterize this invention will be pointed out with particularity in the claims annexed to and forming a part of this specification.

Briefly stated, in accordance with one form of this invention the foregoing objectives are achieved by providing a surface cooking unit including a control device resiliently and pivotally mounted in an open area thereof and arranged to contact the bottom of a utensil placed on the heating unit. The control device includes a temperature sensing element mounted therein so as to rest in intimate heat transfer relation with the utensil, and a surrounding fixed heat shield in multi-point contact with the utensil.

For a better understanding of the invention reference may be made to the following description and the accompanying drawings in which:

Fig. 4 is a cross sectional view taken along the line 4—4 in Fig. 3;

Fig. 5 is a cross sectional view taken along the line 5—5 in Fig. 3; and

Fig. 6 is a fragmentary cross sectional enlarged view of the control device shown in Fig. 3.

Figure 1:
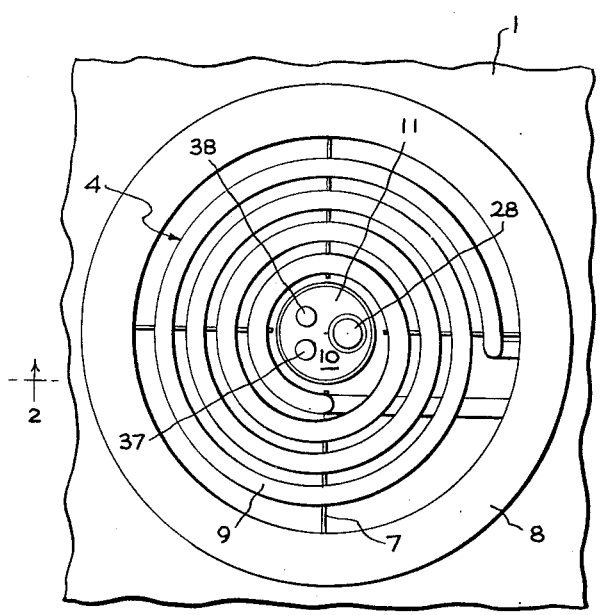
Fig. 1 is a fragmentary top plan view of a surface cooking unit embodying the following invention.

Referring to the drawing, the numeral 1 designates the cooking top of an electric range or the like having a circular opening defined by a downwardly extending flange 2 having an inwardly projecting lip 3 arranged so as to support a surface cooking unit generally designated by the numeral 4, a reflector pan 5 and a control device support 6. Surface heating unit 4 includes a spider supporting structure 7, a trim and support ring 8 and a coiled sheathed heating element 9. The heating element is, of course, provided with suitable electrical terminals (not shown) by means of which it may be connected to a source of power, the power circuit including a thermostatically controlled switch responsive to the control device generally designated by the numeral 10.

The present invention may be utilized in conjunction with a surface heating unit control system of the type disclosed in application Serial No. 382,423, filed September 25, 1953, by Stanley B. Welch (now Patent No. 2,767,296) and assigned to the assignee of the present application, or any other suitable control system which utilizes a control device for detecting utensil temperature.

Control device 10, being located in the central area of surface heating unit 4 is exposed to spillage of foods which, if permitted to penetrate the interior of the device, might well interfere with its temperature sensing function, and accordingly a solid one-piece top member 11 formed of heat insulating material, such as a vitreous or ceramic insulating material, is combined with a generally cylindrical metal shell or side wall 12 to form an integral fluid-tight housing member. Shell 12 is provided with an end flange 13 which engages the notched periphery of top wall 11 and is also provided with an inwardly projecting flange 14 on its lower end so as to at least partially obstruct entrance of foreign materials to the bottom of the control device.

Top wall 11 is secured to a flanged bearing plate 15 by suitable means such as a screw 15a which also supports inner cylindrical shield 16, the latter including a horizontal wall portion and tabs 17 cooperating with flange 14 of outer shield 12 to form a unitary structure. Downwardly projecting portions 18 and 19 on top wall 11 are arranged to space bearing plate 15 therefrom and provide an insulating air space therebetween.

Figure 3:
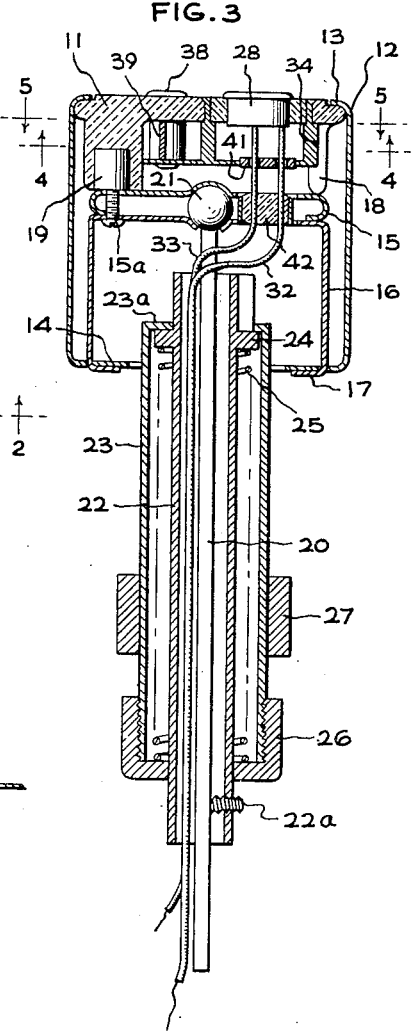
Fig. 3 is an elevation view, in section, of the control device of the present invention.
Figure 2:
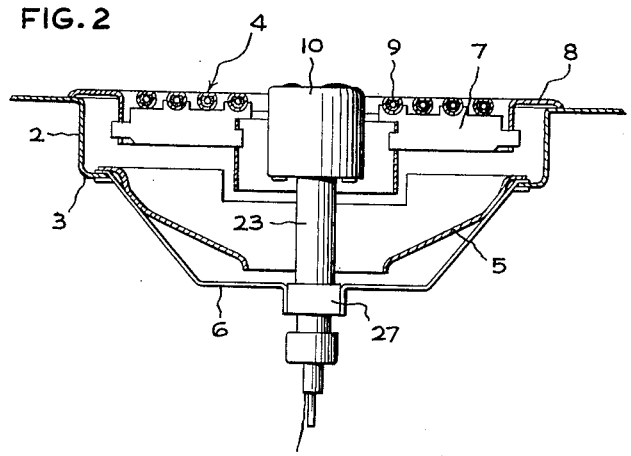
Fig. 2 is a cross sectional view taken along the line 2—2 of Fig. 1.

In order to provide limited movement of control device 11 so that it may conform to various utensil bottom surfaces which may be encountered, it is supported on a vertical shaft 20 by means of a ball and socket joint 21 including a ball on the upper end of the shaft and a socket formed in bearing plate 15 and the central end portion of inner shield 16. Shaft 20, which is a relatively thin strip of rectangular cross section, is supported in a central tube 22 by means of set screw 22a, for example. The hole in inner shield 16 through which shaft 20 passed is rectangular in order to prevent excessive rotation of the control device 10 relative to supporting tube 22, which might damage the leads 32 and 33. Tube 22 is in turn supported within a larger tube 23 provided with an inturned upper flange 23a engageable with a collar 24 on tube 22 so as to secure tubes 22 and 23 in assembled relation and to restrain upper movement of the control device under the influence of spring 25 positioned in the annular space between tubes 22 and 23. As shown in Fig. 3, an end cap 26 on tube 23 provides a seat for spring 25, the other end of the spring bearing against collar 24 on tube 22. The complete control device assembly is supported on support member 6 which may be riveted or otherwise secured to a clamping element 27 encircling supporting tube 23.

Referring now to Figs. 3 and 6 of the drawing, a temperature sensing element 28 is secured in top wall 11 with its top surface projecting above top wall 11 in an off center position with respect to the axis of vertical shaft 20 and the point about which the control device pivots. Sensing element 28 comprises an inverted generally cup-shaped shell formed of a metal having high heat conductivity, such as aluminum and, in the present embodiment, a disk shaped thermistor, the resistance of which changes in a predetermined manner with changes in temperature. Thermistor 29 has its upper face soldered to the inside surface of element 28. The annular space around the thermistor is filled with potting compound 30 to improve heat transfer to the thermistor. The underside of the thermistor is enclosed by mica washer 31. Electrical leads 32 and 33 are secured to shell 28 and thermistor 29 respectively and pass downwardly through the control device by means of the interior of tube 22, thus providing means for connecting the thermistor in a control circuit.

It is important that thermistor 29 be shielded from all temperatures other than that of the utensil being heated on cooking unit 4, and accordingly the bottom portion of sensing element 28 is shielded and enclosed by shield structure 34, which includes a cylindrical side wall 35, a bottom wall 36 and heat conducting studs 37 and 38. Studs 37 and 38 extend upwardly from bottom wall 36 through insulated top wall 11 and terminate in flattened button portions whose top walls are in a plane coextensive with the plane of the top surface of temperature detector 28. Shield 34 may be conveniently supported on top wall 11 by means of studs 37 and 38 cooperating with a locating lug 39 projecting upwardly from bottom wall 36 and adapted to engage the lower surface of top wall 11. As best shown in Fig. 6, cylindrical wall 35 of the shield 34 projects upwardly through a cylindrical opening in top wall 11 and sensing element 28 is centered in this opening, being supported by an insulating washer 40 wedged or otherwise secured in engagement with cylindrical wall 35.

The electrical leads connecting sensing element 28 to the control circuit for heating element 4 extend downwardly from sensing element 28 through an insulating supporting bushing 41 mounted in an opening in the bottom wall 36 of shield 34, and through a second insulating bushing 42 secured in an opening in bearing plate 15 and the horizontal wall of inner shield 16. From the lower insulator 42, leads 32 and 33 extend downwardly through tube 22 and outwardly through the lower end of the tube.

From the foregoing description it is evident that the control unit of the present invention functions to engage intimately the bottom of a cooking utensil resting on cooking unit 4 and to provide means for accurately sensing the temperature of the utensil so as to supply a signal for controlling the energization of heating element 9. In particular it will be noted that if a utensil having a flat smooth bottom is placed on the heating element, the flat surfaces of sensing element 28 and studs 37 and 38 of shield 34 engage the utensil bottom in surface contact so that both the sensing element and the shield are maintained at substantially the temperature of the utensil. By maintaining the shield at utensil temperature sensing element 28 is effectively isolated from other heat sources such as the heating element 9 itself and the metallic parts of the surface cooking unit which may be at temperatures far different from utensil temperature. Double side walls 12 and 16 and spaced horizontal walls 15 and 16a of the control unit also contribute to the thermal isolation of sensing element 28, and if desired their insulating effect may be increased by the addition of sheet aluminum insulation or the like in the annular space between walls 12 and 16, and the space between walls 15 and 16a.

If a utensil having an uneven bottom is placed on surface cooking unit 4, both sensing element 28 and studs 37 and 38 will be maintained in contact with the bottom in at least line or point contact as a result of the universal mounting of the control unit provided by ball and socket joint 21 and the triangular pattern arrangement of the sensing element 28 and studs 37 and 38. Thus even though the bottom of the utensil has an uneven configuration, sensing element 28 will effectively be maintained at utensil temperature and will provide a reasonably accurate control signal for controlling the energization of the heating unit. Finally it will be noted that these advantages are incorporated in a unitary housing structure having no relatively movable parts which are independently spring biased, and therefore the control device of the present invention does not require heat resistance flexible seals or the like for excluding spilled food from the interior of the unit.

While I have shown and described a specific embodiment of my invention, I do not desire my invention to be limited to the particular construction shown and described and I intend by the appended claims to cover all modifications within the true spirit and scope of my invention.

What I claim as my invention is:

1. A control device for use in conjunction with a surface cooking unit having an opening therein comprising a housing member adapted to be located in said opening so as to rest in heat conducting engagement with a utensil supported on said cooking unit, said housing member including a top wall formed of heat insulating material, a temperature sensing element secured in said top wall with its top surface projecting above said top wall so as to engage said utensil, and a shield comprising side and bottom walls of heat conducting material located within said housing member surrounding and enclosing said sensing element, said shield including a portion extending through said top wall so as to engage said utensil, whereby heat is freely conducted from said utensil to said sensing element and said shield.

2. A control device for use in conjunction with a surface cooking unit having an opening therein comprising a housing member adapted to be located in said opening so as to rest in heat conducting engagement with a utensil supported on said cooking unit, said housing member including a heat insulating top wall and side walls depending from said top wall, a temperature sensing element secured in said top wall with its top surface projecting above said top wall so as to engage said utensil, and a shield comprising side and bottom walls of heat conducting material located within said housing member surrounding and enclosing said sensing element, said shield including a heat conducting portion extending through said top wall of said housing member so as to engage said utensil, whereby heat is freely conducted from said utensil to said sensing element and said shield.

3. A control device for use in conjunction with a surface cooking unit having an opening therein comprising a housing member adapted to be located in said opening so as to rest in heat conducting engagement with a utensil supported on said cooking unit, said housing member including a heat insulating top wall, side walls depending from said top wall, a temperature sensing element secured in said top wall with its top surface projecting above said top wall so as to engage said utensil, and a shield comprising side and bottom walls of heat conducting material located within said housing member surrounding and enclosing said sensing element, said shield including a pair of heat conducting studs extending through said top wall of said housing member, the top surfaces of said temperature sensing element and said studs being flat and lying in a common plane spaced above the plane of said top wall, whereby heat is freely conducted from said utensil to said sensing element and said shield.

4. A control device for use in conjunction with a surface cooking unit having an opening therein comprising a housing member adapted to be located in said opening so as to rest in heat conducting engagement with a utensil supported on said cooking unit, supporting means for resiliently supporting said housing member in said opening for limited pivotal movement about a pivot point located within said housing member, said housing member including a top wall formed of heat insulating material and a side wall depending from said top wall, a temperature sensing element secured in said top wall with its top surface projecting above said top wall in an off-center position with respect to said pivot point, a shield comprising side and bottom walls of heat conducting material located within said housing member surrounding and enclosing said sensing element, a pair of heat conducting studs secured to said shield and extending through said top wall in off-center positions with respect to said pivot point, the top surfaces of said sensing element and said studs being flat and lying in a common plane spaced above the plane of said top wall, said sensing element and studs being arranged in a triangular pattern the central portion of which overlies said pivot point.

5. In a surface cooking unit, an electric heating element lying in a horizontal plane and surrounding an open central area, means for controlling the energization of said heating element comprising a control device for sensing the temperature of a utensil resting on said heating element, said control device being located in said central area, mounting means for resiliently supporting said control device and biasing it into engagement with the bottom of said utensil, said mounting means including a vertical shaft provided at its upper end with a ball and socket connection with said control device, said control device including a top wall formed of heat insulating material and spaced inner and outer heat insulating side walls depending from said top wall, a temperature sensing element secured in said top wall with its top surface projecting above said top wall in an off-center position with respect to the axis of said vertical shaft, a shield for said sensing element comprising side and bottom walls of heat conducting material located within said housing member surrounding and enclosing said sensing element, said shield including a pair of spaced heat conducting portions extending through said top wall in off-center positions with respect to said axis, whereby a utensil resting on said heating element makes three point contact with said control device and heat is freely conducted from said utensil to said sensing element and said shield.

References Cited in the file of this patent

UNITED STATES PATENTS 2,764,663   Molyneaux  ----------- Sept. 25, 1956